Feb. 29, 1944. W. H. FRANK ET AL 2,343,216
ELECTRICAL DISTRIBUTION SYSTEM
Filed Dec. 2, 1941 3 Sheets-Sheet 1
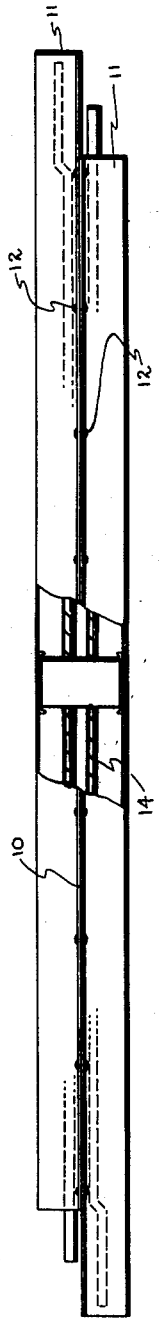
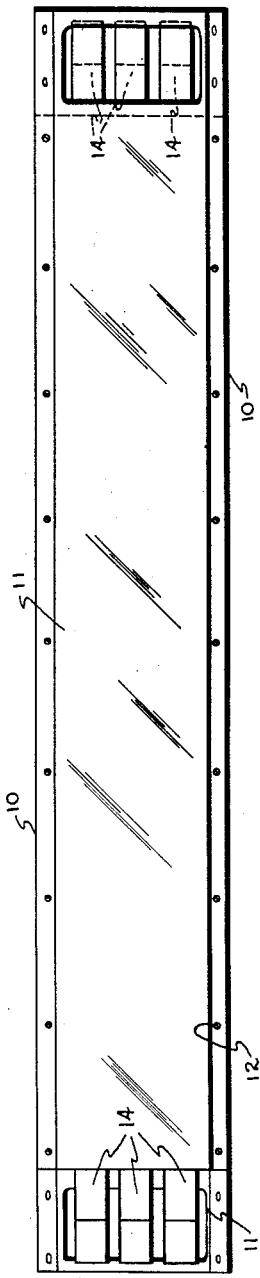
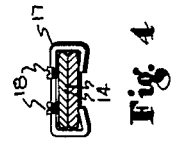
INVENTORS.
WILLIAM H. FRANK
LAWERENCE E. FISHER
ROBERT L. FRANK
BY Daniel G. Cullen
ATTORNEY.

INVENTORS.
WILLIAM H. FRANK
LAWERENCE E. FISHER
ROBERT L. FRANK
BY Daniel G. Cullen
ATTORNEY.

INVENTORS.
WILLIAM H. FRANK
LAWERENCE E. FISHER
ROBERT L. FRANK
BY Daniel G. Cullen
ATTORNEY.

Patented Feb. 29, 1944

2,343,216

UNITED STATES PATENT OFFICE 2,343,216

ELECTRICAL DISTRIBUTION SYSTEM

William H. Frank, Lawrence E. Fisher, and Robert L. Frank, Detroit, Mich., assignors to Bulldog Electric Products Company, Detroit, Mich., a corporation of West Virginia Application December 2, 1941, Serial No. 421,378

7 Claims. (Cl. 174—99)

This application relates to electrical distribution systems.

For an understanding of the system herein disclosed reference should be had to the appended drawings.

In these drawings,

Figs. 1 and 2 show a unit length of distributor, adapted to be joined end to end to similar unit lengths to form a distributor run.

Figs. 3 and 4 illustrate means for joining conductors of the distributor end to end.

Figure 5:
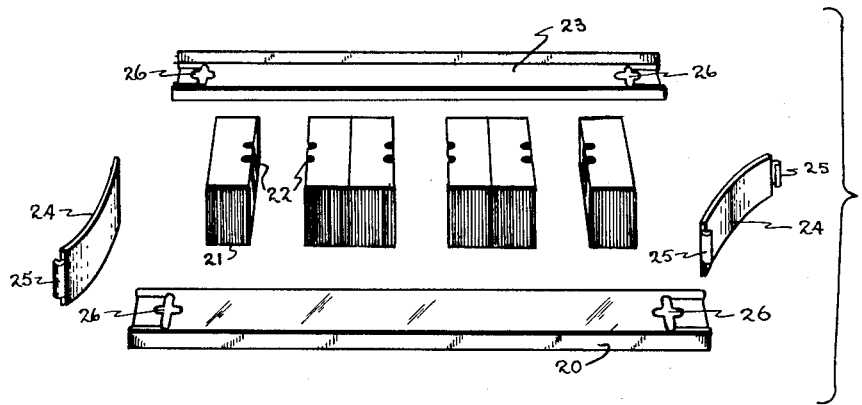
Figs. 5 and 6 illustrate means for maintaining conductors within the distributor.
Figure 6:
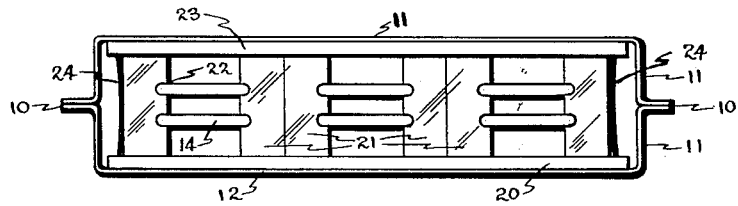
Figure 7:
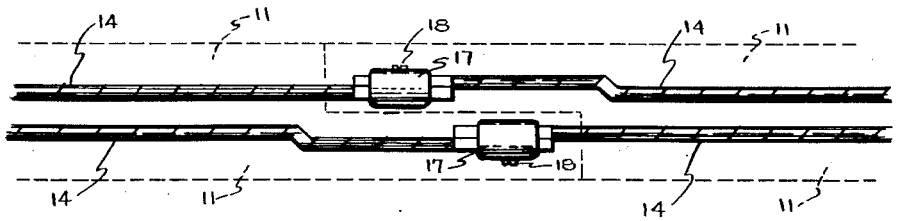
Fig. 7 shows a detail of the end to end joint of conductors.
Figure 8:
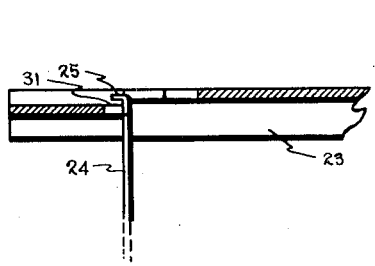
Figs. 8 and 9 show parts in detail.
Figure 9:
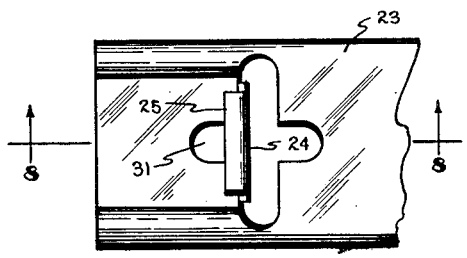
Figure 12:
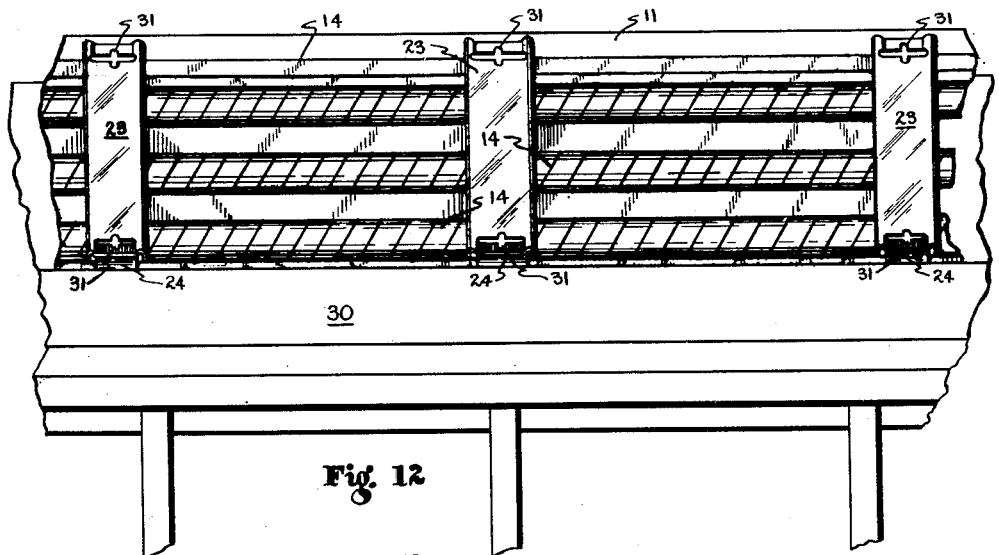
Figure 11:
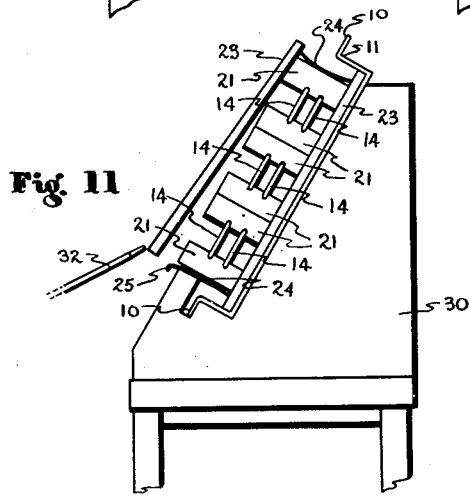
Figure 10:
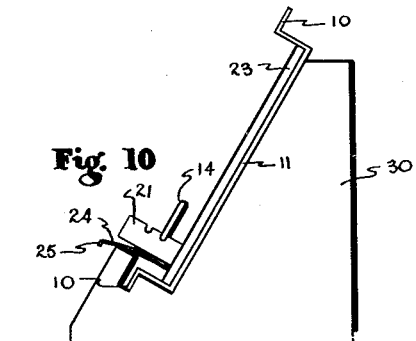

Figs. 10, 11, and 12 show the assembly operation.

The drawings show a unit length of distributor adapted to be joined end to end to other unit lengths of distributor to form a distributor run. The casing of the unit length shown is longitudinally split, on splint plane 10, into a plurality of sections joined by bolts 12; the casing contains lengths 14 of thin wide flat bar conductors.

At the ends of a unit length of distributor, the casing sections are offset longitudinally, and the conductors are offset, laterally as well as longitudinally, to facilitate the forming of lap joints between the unit lengths, end to end. For tightly securing the lapped portions of the conductors, C clamps 17 are utilized and screws 18 thread into the bights of the C clamps to bind the lapped ends of the conductors to each other and to the C clamps.

At longitudinally spaced points of the distributor there are disposed cross members 20, preferably welded to one wall of the distributor casing. Disposed on these members are insulating blocks 21 having grooves 22 formed for receiving the edges of the wide, flat, thin conductors. Cross members 23 disposed on the sides of the blocks opposite the members 20 are held down by spring hooks 24, whose hooked ends 25 pass through openings 26 in the members 20 and 23 and hook over the edges of these openings. These springs are bowed for resiliently biasing the conductor edges and the blocks towards each other and thus holding the blocks and the conductors, between members 20 and 23, in a firm, unitary spring held assembly.

The arrangement herein disclosed suitably maintains the conductors in place without piercing or damaging the insulation covering 28, in the form of insulator tape, which may be wrapped around the conductors. In addition, the arrangement herein disclosed adequately restrains shifting of the conductors, whether the casing can be disposed in the position of Fig. 1 with its separation plane 10 horizontal, or in the position of Fig. 2, with the separation plane 10 vertical, and by preventing relative movement of the casing and the conductors, maintains the system free from noise and rattle due to excessive vibration of the parts relatively. However, the clamping provided by the arrangement herein shown is a resilient clamping, rather than one which has no resilience, and consequently breakage of the insulator blocks is minimized.

The spring hooks function as well to bias the members 23 towards the members 20 and thus exert a holding pressure through the blocks against the wide faces of the conductors; primarily, they serve to bias the blocks towards the edges of the conductors and to exert clamping pressure on the edges. However, the clamping pressure exerted on the edges of the conductors by the insulator blocks, while serving to retain these conductors against shifting, and while serving to maintain the desired spacing between conductors and between the conductors and the casing, does not hold the conductors against shifting slightly, as needed, due to expansion and contraction stresses.

Further, the blocks and spring hooks are dimensioned the same, regardless of the width of the conductors. It is present practice to make the conductors of varying width for varying capacities of distribution systems; by using our arrangement, the same blocks may be utilized regardless of the varying width of the conductors. Only the conductors themselves, the casing width, and the length of the members 20 and 23 will vary in size.

Variations in sizes may be obtained very simply, because the arrangement herein disclosed does not depend upon standardized conductor widths so much as it depends upon standardization of the thickness of the conductors, the spacing between the conductors, and also between the conductors and the casing, and the depth of the casing. These standards are very easy to maintain and the arrangement herein shown may be utilized for varying sizes of distributors without changing the sizes or dimensions of the blocks or the spring hooks.

In addition, the arrangement herein disclosed is such that there is no requirement for perforating the casing in order to mount the conductors or other parts in place and to hold them securely. Excessive perforation in casings of distribution systems is considered undesirable. Nuts and bolts are not here used for maintaining the conductors in place.

In addition, excessive manipulation of the heavy and large casing sections for mounting the conductors therein is eliminated here because of the arrangement disclosed.

In addition, it is practical to use the insulator blocks at suitable points of the distributor without anchoring them with respect to the casing, merely for the purpose of maintaining the desired spacing between the parts. At such points, for example, insulator blocks alone may be utilized, or, if desired, insulator blocks and cross members with spring hooks, may be utilized, and merely by not welding cross members to the casing, the assemblies function for spacing the conductors relatively and not for anchoring them to the casing.

An assembly bench is shown. For assembly, a casing section 11 is laid on table 30, cross members 20, if not already welded thereto, may be welded thereto at that time; then lower spring hooks 24 are hooked to lower ends of such cross members; then, blocks and bus bars are built up over the parts 20, 24; then upper spring hooks 24 are hooked to upper ends of cross members 20; then, upper ends of cross members 23 are hooked to the upper spring hooks 24; then, the lower ends of cross members 23 are hooked to the lower spring hooks 24, by inserting through tool holes 31 of the cross members 23 a tool 32. Thereafter, a casing section 11 is laid over the assembly and bolted to the casing section 11 already on the bench.

Now having described the system herein disclosed, reference should be had to the claims which follow.

We claim:

1. An electrical distribution system comprising a sectional casing having therein an assembly of elongated thin flat bar conductors laid alongside, edge near edge, and insulator blocks, these being between spacing the conductors and disposed to engage narrow edges of the conductors, and means for securing the blocks and conductors in separable assembly, biasing the conductor edges against block surfaces, the casing being split longitudinally into laterally separable sections, with the split in the casing so arranged with respect to the blocks and conductors that the direction in which conductors and blocks are normally laterally assembled and disassembled being transverse to the direction in which casing portions are normally laterally separated from each other, the conductors having their wide faces transverse to the direction of lateral separation of casing portions from one another, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors.

2. An electrical distribution system comprising a sectional casing having therein an assembly of elongated thin flat bar conductors laid alongside, edge near edge, and insulator blocks, these being between and spacing the conductors and disposed to engage narrow edges of the conductors, and means for securing the blocks and conductors in separable assembly, biasing the conductor edges against block surfaces, the casing being split longitudinally into laterally separable sections, with the split in the casing so arranged with respect to the blocks and conductors that the direction in which conductors and blocks are normally laterally assembled and disassembled being transverse to the direction in which casing portions are normally laterally separated from each other, the conductors having their wide faces transverse to the direction of lateral separation of casing portions from one another, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors, the means being resilient for biasing the edges of the conductors resiliently against the conductor engaging surfaces of the blocks.

3. An electrical distribution system comprising a sectional casing having therein an assembly of elongated thin flat bar conductors laid alongside, edge near edge, and insulator blocks, these being between and spacing the conductors and disposed to engage narrow edges of the conductors, and means for securing the blocks and conductors in separable assembly, biasing the conductor edges against block surfaces, the casing being split longitudinally into laterally separable sections, with the split in the casing so arranged with respect to the blocks and conductors that the direction in which conductors and blocks are normally laterally assembled and disassembled being transverse to the direction in which casing portions are normally laterally separated from each other, the conductors having their wide faces transverse to the direction of lateral separation of casing portions from one another, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors, one of the cross members being anchored to the casing.

4. An electrical distribution system comprising elongated thin flat bar conductors laid alongside, edge near edge, insulator blocks between and spacing the conductors and disposed to engage narrow edges of the conductors, and means for securing the blocks and conductors in assembly, biasing the edges of the conductors against the blocks, the means being resilient for biasing the edges of the conductors resiliently against the conductor engaging surfaces of the blocks, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors.

5. An electrical distribution system comprising elongated thin flat bar conductors, at least four in number, arranged in rows, each row having at least two conductors, the conductors of each row being alongside, edge near edge, the conductors of each row being alongside those of an adjacent row, wide surface near wide surface, insulator blocks between and spacing the conductors and disposed to engage narrow edges of the conductors, and means for securing the blocks and conductors in assembly, biasing the edges of the conductors against the blocks, the means being resilient for biasing the edges of the conductors resiliently against the conductor engaging surfaces of the blocks, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors, and a casing surrounding the assembly of blocks and conductors, one of the cross members being anchored to the casing.

6. An electrical distribution system comprising elongated thin flat bar conductors laid alongside, edge near edge, insulator blocks between and spacing the conductors and disposed to engage narrow edges of the conductors, and means for securing the blocks and conductors in assembly, biasing the edges of the conductors against the blocks, the means being resilient for biasing the edges of the conductors resiliently against the conductor engaging surfaces of the blocks, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors, and a casing surrounding the assembly of blocks and conductors, one of the cross members being anchored to the casing.

7. An electrical distribution system comprising elongated thin flat bar conductors, at least four in number, arranged in rows, each row having at least two conductors, the conductors of each row being alongside, edge near edge, the conductors of each row being alongside those of an adjacent row, wide surface near wide surface, insulator blocks between and spacing the conductors and disposed to engage narrow edges of the conductors, and means for securing the blocks and conductors in assembly, biasing the edges of the conductors against the blocks, the means being resilient for biasing the edges of the conductors resiliently against the conductor engaging surfaces of the blocks, the conductor engaging surfaces of the blocks having grooves receiving the conductor edges, the system also comprising cross members disposed parallel to the wide faces of the conductors, outside the blocks, with the means for biasing the conductor edges against the blocks also functioning for biasing the cross members towards each other, to bias the walls of the block grooves against flat faces of the conductors.

WILLIAM H. FRANK.
LAWRENCE E. FISHER.
ROBERT L. FRANK.